Figure 1:
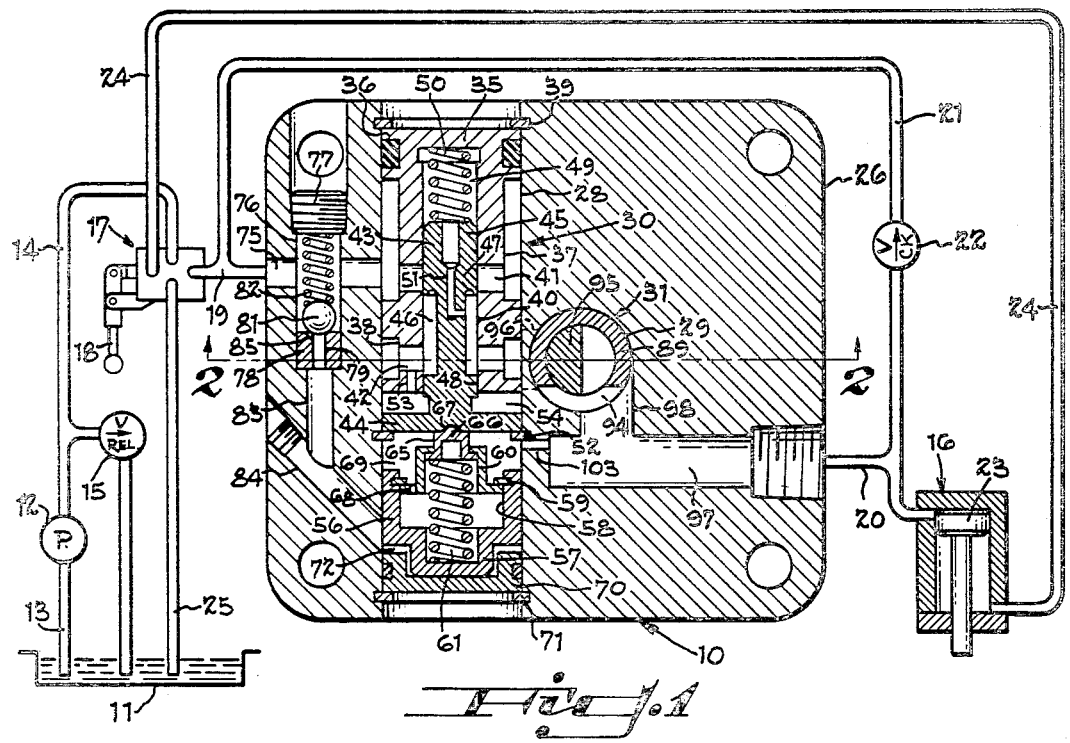

Oct. 22, 1968     W. H. MEISEL     3,406,714

ANTI-SURGE FLOW CONTROL VALVE

Filed July 7, 1966

INVENTOR.
William H. Meisel
BY
Wood, Herron & Evans.
ATTORNEYS

United States Patent Office 3,406,714
Patented Oct. 22, 1968

3,406,714
ANTI-SURGE FLOW CONTROL VALVE
William H. Meisel, Columbus, Ohio, assignor to Abex Corporation, New York, N.Y., a corporation of Delaware
Filed July 7, 1966, Ser. No. 563,518
12 Claims. (Cl. 137—501)

This invention relates generally to devices which are adjustable to selectively regulate the flow of pressure fluid in a line or conduit at a desired volume per unit time. The invention is directed to improvements in flow control valves of the type shown in Resnick, U.S. Patents Nos. 2,986,161, 2,936,152, and 3,093,892.

Flow control valves of this general type are adjustable to a desired flow rate, for example by turning a knob or handle to a position corresponding to the selected rate. Such valves include an adjustable flow control orifice through which flow passes between the inlet and outlet of the valve, having a flow area which is established by the setting of the control knob. An automatically adjusting compensating orifice is connected to the flow control orifice to maintain a pressure drop across the latter orifice which is substantially constant, regardless of pressure fluctuations at the inlet or outlet of the valve, thereby to establish a constant flow rate across the flow control orifice for any given adjusted size thereof.

In previous flow control valves of this general type, including those shown in the above mentioned Renick patents the pressure compensator includes a movable spool which cooperates with a fixed port to form a compensator orifice. In such valves the compensator orifice has been normally open; that is, in the absence of flow through the valve the compensator spool is in an open position with respect to the fixed port member. In consequence, at the initiation of flow through the valve a sudden and undesirable surge may occur by reason of the time required for the compensator spool to move from its initial full open position to that required to establish the proper pressure drop across the flow control orifice. Those skilled in the art will recognize that such surges can result in severe damage either to the valve or to the circuit or to the hydraulic mechanism being operated, by applying a large flow of fluid under pressure to a work load which may be at rest or under heavy stress.

In contrast, the flow control valve of this invention is characterized by the provision of means forming a normally closed compensator orifice which prevents any undesirable surge at maximum flow rate through it at the commencement of flow, with pressure operated means for opening the compensating orifice when pressure is applied across the closed valve.

Broadly put, in ap referred embodiment a valve in accordance with this invention includes means forming a selectively adjustable flow control orifice and means forming a pressure compensating orifice which is connected with the flow control orifice between an inlet and an outlet. The pressure compensating orifice forming means includes a spool which is movable with respect to a port, and which is resiliently biased toward a position closing the compensating orifice. Pressure positioned biasing-overriding means are provided to override the force of the biasing means and to exert a resilient opening force when a pressure differential is applied between the inlet and outlet ports. These biasing overriding means preferably include a piston, one surface of which is subjected to pressure from the inlet through a passageway, and a spring moved by the piston into engagement with the spool. Pressure is applied through the aforementioned passageway to the piston to operate the same through a fixed restrictor, and a check valve may be provided to permit rapid release of fluid from the piston toward the inlet when the pressure differential between the inlet and outlet ports drops below a predetermined minimum amount required to operate the valve.

Further objects and advantages of the present invention will be apparent from the following description, reference being had to the accompanying drawings wherein a preferred form of the invention is shown.

Figure 2:
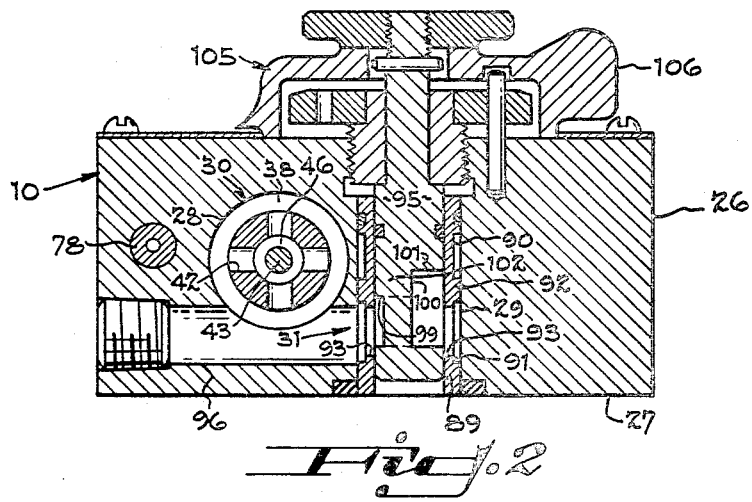

In the accompanying drawings:

FIGURE 1 is a diagrammatic showing of a system for operating a hydraulic motor or ram, the showing including a view in section of a preferred form of control valve which includes the features of this invention, the view of the valve showing particularly the pressure compensating mechanism of the valve; and FIGURE 2 is a view in section of the valve shown in FIGURE 1, the view being taken on line 2—2 thereof and showing particularly the mechanism which forms the adjustable flow control orifice in the valve and the adjusting mechanism by which the adjustable orifice is adjusted.

In the drawings the flow control valve in accordance with this invention is designated generally by 10. The hydraulic circuit shown in FIG. 1 for purposes of illustration, in which the valve 10 is installed, includes a reservoir or tank 11 for hydraulic fluid, a pump 12 which receives fluid from tank 11 through a conduit 13 and discharges fluid under pressure into a conduit 14. Conduit 14 is connected to tank 11 through a relief valve 15. It will be appreciated that the elements 11 through 15 merely constitute a conventional source of pressure fluid by which a hydraulic ram or motor 16 is operated. The high pressure conduit 14 is connected to the inlet port of a selectively operable flow direction control valve 17, which for purposes of illustration is shown as being of the manually operated type. Valves similar to valve 17 are well known in the art and therefore this valve is not shown and described in detail. The valve 17 illustrated includes a manual control handle or lever 18. When the lever 18 is in the position shown, the conduit 14 is blocked at the valve 17 and the entire output of fluid from the pump 12 is by-passed through relief valve 15 to tank 11. When lever 18 is shifted in one direction from the position illustrated, the conduit 14 is connected to a conduit 19 leading to valve 10 and fluid will flow through the flow control valve to a conduit 20 connected to the top of ram or motor 16. Conduits 19 and 20 are interconnected by a by-pass conduit 21 which includes a check valve 22. This check valve 22 prevents fluid from flowing from the conduit 19 to conduit 20 but permits substantially free flow in the opposite direction, that is, from the conduit 20 to the conduit 19.

Hydraulic fluid under pressure which is directed to the top of the cylinder of motor 16 forces the piston 23 thereof downwardly and displaces hydraulic fluid from the bottom of the cylinder. The displaced fluid flows through a conduit 24 to the valve 17 and through a conduit 25 to the tank 11.

When the lever 18 is shifted in the opposite direction from the position illustrated, conduit 14 is connected to conduit 24 and conduit 19 is connected to tank through conduit 25. Under these conditions, pressure fluid flows from conduit 14 through conduit 24 to the bottom of the cylinder of motor 16 and forces piston 23 upwardly, displacing fluid above the piston through conduit 20, by-pass conduit 21 and check valve 22 to the valve 17, from which the fluid is directed through conduit 25 to tank 11. The conduit 21 and the check valve 22 may be contained within the body 26 of the flow control valve 10.

From the foregoing, it will be seen that hydraulic fluid flowing to the chamber above piston 23 must flow through the adjustable volume constant flow control valve 10, but that when the direction of flow is reversed, the hydraulic fluid flowing from the chamber above piston 23 can bypass the valve 10 at low pressure through conduit 21 and check valve 22.

The adjustable volume constant flow control valve 10 is included in the hydraulic circuit or system for causing hydraulic fluid to be admitted to the top of the ram 16 at a constant volumetric rate of any adjusted setting of the valve 10, regardless of pressure fluctuations either in the high pressure supply conduit 19 or in the conduit 20.

Flow control valve 10 includes a body 26 which may suitably be in the form of a rectangular block having a base or bottom surface 27.

The body 26 is provided with two through bores 28 and 29, the axes of which extend at right angles to each other and which are spaced apart. These bores 28 and 29 contain, respectively, mechanism forming pressure compensating means and a flow control orifice which are connected in series. The axis of bore 28 is parallel with the base surface 27 of the body and this bore contains elements which cooperate to form the pressure compensating means designated generally at 30. Bore 29 contains mechanism which cooperates to form the adjustable or variable flow control orifice means 31 of the valve.

The elements which cooperate to form the pressure compensating means 30 of valve 10 include a cylindrical element, sleeve or liner 35 having spaced circumferential grooves 36, 37 and 38 formed around it at axially spaced positions. Liner 35 is inserted into bore 28 and is retained therein at its upper end by a snap ring 39. Liner 35 is sealed to bore 28 by an O-ring contained within the groove 36 which is adjacent snap ring 39. Liner 35 also includes an axial bore 40 which is connected to grooves 37 and 38 by ports or passages 41, 42 respectively.

A pressure compensator spool 43 is also contained within body bore 28, and this element includes a piston or head 44 and a smaller diameter hollow stem portion 45 which extends into and reciprocates in liner bore 40. Stem portion 45 includes a circumferential groove 46 which defines a pair of lands 47 and 48 on stem portion 45. The sharp peripheral edge of land 47 which is adjacent stem groove 46 cooperates with the liner ports or passages 41 to form a valve for controlling the flow of fluid through ports 46 in accordance with the axial position of the edge of land 47. Land 48 functions merely as a guide or bearing for the compound piston element 43, and it never closes the ports or passages 42. A passageway 51 in stem portion 45 provides constant fluid communication between stem groove 46 and the chamber 49 which is defined in the closed upper end of liner bore 40 above stem 45. The spool head 44 is of such diameter as to sealingly slide in body bore 28, and the entire spool 43 is urged downwardly with respect to liner 35 by an offset spring 50 in chamber 49. A snap ring 52 in body bore 28 limits the extent of downward movement of compensator spool 43. A port 53 in liner 35 provides constant fluid communication between port 42 and the chamber 54 which is defined in body bore 28 between the lower end of liner 35 and the upper face of head 44.

A stepped cylindrical or cup-shaped piston element 56 is slidably disposed in body bore 28 below snap ring 52 therein. This piston 56 has a reduced diameter lower portion 57 and a stepped internal bore 58, adjacent the upper end of which a snap ring 59 is received in a groove. Snap ring 59 limits the upward travel of an axially movable hat-shaped spring retainer 60 having a peripheral flange portion which slides within the larger diameter portion of piston internal bore 58 and which is engageable with snap ring 59. An onset spring 61 is compressed in bore 58 between the end of piston internal bore 58 and a conically pointed spool contactor 65 which projects through an opening formed in the upper end of spring retainer 60. Contactor 65 is provided with a conical apex 66 which is engageable with a corresponding depression 67 formed in the lower surface of spool head 44. A passage 68 in the flange of spring retainer 60 provides for fluid communication between piston bore 58 and a chamber 69 which is defined in body bore 28 between piston 56 and the lower surface of head 44.

Body bore 28 is closed at its lower end by a cup-shaped plug 70 which is sealed with respect to the bore by suitable means such as the O-ring shown, and downward movement of this plug 70 is prevented by a snap ring 71 in the bore. Plug 70 limits downward movement of piston 56, and in the maximum downward position of piston 56 the reduced diameter portion 57 of piston 56 bears against plug 70. A chamber 72 is defined in bore 28 between piston 56 and plug 70. As will be seen the piston 56 is moved axially in bore 28, between stop 52 and plug 70, by a pressure differential between chambers 69 and 72.

Valve body 26 includes an inlet port 75 which communicates with groove 37 in liner 35, and as shown in FIGURE 1, in use this inlet port 75 is connected to the pressure inlet line 19. Inlet port 75 is intersected in body 26 by a vertical bore 76 which is closed at its upper end by a plug 77. A check valve is preferably provided in bore 76, comprising a check valve seat 78 having an axial passage 79 and a ball element 81 which is urged toward seat 78 by a check valve spring 82. Passage 79 communicates through bores 83 and 84 in body 26 with the chamber 72 beneath the piston 57. Bore 84 is plugged at its outer end as shown. It will be seen that the check valve 78, 81 is operative to permit substantially unrestricted flow of fluid from chamber 72 to inlet port 75. A small fixed flow restrictor or orifice 85 permits a small by-pass flow past the check valve even when ball 81 is on seat 78, and may be formed as a groove or notch in the edge of seat 78.

The flow control mechanism 31 contained in through bore 29 includes a liner, sleeve or thimble 89 which is contained within the bore 29 and has a close sealing fit therewith. This liner or sleeve 89 is provided with two circumferential grooves 90 and 91 which are separated by a land 92 and its upper end (as seen in FIGURE 2) is sealed to the bore 29 by an O-ring. This O-ring is contained within a groove formed in the liner sleeve 89. Another O-ring lies in a groove formed in the body 26 around the sleeve, adjacent base 27. This latter O-ring is retained in its groove by suitable means such as a sub-plate, not shown.

Groove 91 in sleeve 89 is connected at all times to the interior of the sleeve by passage means in the form of a pair of bores or holes 93 formed through the walls of the sleeve. Groove 90 is connected to the interior of the sleeve by a rectangular slot 94 through the wall of the sleeve. The peripheral surfaces of slot 94 are provided with sharp edges where it joins the bore of sleeve 89. A passageway 96, plugged at its outer end, provides constant fluid communication through body 26 between liner groove 38 of the compensator and sleeve groove 91 of the flow control mechanism 31. Sleeve slot 94 of the flow control mechanism is connected to the valve outlet 97 by a passageway 98. In use the outlet 97 is connected to conduit 20, as seen in FIGURE 1. A passage 103 connects chamber 69, beneath spool head 44 and above piston 56, to outlet 97.

The bore of sleeve 89 is cylindrical, and this bore receives a flow control valve element 95 which is adjustable therein both axially or longitudinally, and rotationally. This element 95 is a shaft fitting closely but slidably in the sleeve bore, and is sealed thereto by an O-ring as shown. The lower end of shaft 95 is provided with a circumferentially extending groove 99 which is open to the bores 93 in sleeve 89 at all times and this groove 99 joins or is intersected by a notch or slot 100 milled in the shaft and extending at right angles to the axis thereof. The depth of slot 100 is such that the bottom of the slot lies substantially on the longitudinal axis of the shaft 95 and the slot is of greater width, i.e., it has a greater axial dimension than, groove 99. The lowermost side wall of slot 100 lies in the same plane as the lowermost side wall of groove 99 and, because the axial dimension of the slot 100 is greater than the width of groove 99, the uppermost side wall 101 of slot 100 lies in a plane above the plane of the uppermost side wall of groove 99 to provide a solid semicircular shaft portion 102 having sharp edges where it joins the walls of slot 100 and which, upon rotary adjustment of the shaft 95, serves to adjust the length of the adjustable flow control orifice of the control valve 10 formed by it and the rectangular slot 94.

As previously mentioned, the valve element or shaft 95 is adjustable both axially and rotationally in sleeve 89. The means for so adjusting the shaft is designated generally at 105, and includes a handle or adjusting knob 106. This means may for example be identical to that shown and described in the previously mentioned Renick Patent No. 2,986,161, to which reference may be had for a more complete description.

The flow control orifice of valve 10 is formed by the rectangular slot 94 in sleeve 89 and the slot 100 in shaft 95. The relative positions to which these elements are adjusted determines the effective size or open area of the flow control orifice. When the upper side wall 101 of slot 100 is adjusted axially (upwardly or downwardly as seen in FIGURE 2) the effective width (height) of the slot 94 will be changed. When shaft 95 is rotated, one or the other ends of slot 100 and semi-cylindrical shaft portion 102 will function to adjust the effective length (periphery) of the slot 94.

The width to which the flow control orifice is adjusted by axial movement of shaft 95 determines the range of flow, for example in gallons per minute, through the orifice, and the length to which the orifice is adjusted, by rotation of knob 106 determines the actual volumetric flow in the preselected operating range. For example, assume that the width of the orifice is adjusted or set to permit a maximum flow of five gallons of fluid per minute through the valve, then the length of the orifice may be adjusted by turning the knob 106 to permit any flow of fluid from zero up to the maximum predetermined by the setting or adjusted width of the orifice, as described in Renick Patent No. 2,986,161.

By way of illustration, but not limitation, offset spring 50 may exert a downward force on spool 43 equivalent to approximately 15 p.s.i. in chambers 49 and 54; onset spring 61 may exert an upward force on the spool, when it is biasing the latter, equivalent to 70 p.s.i. in chamber 69; and the check valve spring 82 may exert a force equivalent to about 5 p.s.i. in chamber 72.

In flow controlling operation of the valve 10, the path of fluid flow through the valve is from inlet 75 to liner circumferential groove 37, ports 41, through the compensator orifice 41, 47, and compensator spool groove 46, liner ports 42 and groove 38, body bore 96 to groove 91 and ports 93 of the flow control sleeve 89. From the ports 93, fluid passes into the slot 100 in shaft 95 and upwardly in this slot to the adjustable flow control orifice formed by the slot 94 and groove 100. From this orifice the fluid flows through passage 98 to the outlet 97 and thence to conduit 20 of the hydraulic system.

Under steady state operating conditions the fluid pressure in chamber 72 on one side of piston 56 is equalized with the pressure at inlet 75, by reason of the limited communication provided across orifice 85. The pressure in chamber 54 above head 44 is equalized with that in chamber 49 above stem 47, by reason of the communication provided through openings 53 and the stem internal passageway 51. Pressure equalization between outlet 97 and chamber 69 below piston head 44 and on the upper side of piston 56, is provided through port 103.

As previously indicated, when the flow control valve 10 is operating it will maintain a constant volumetric flow rate at its exhaust or outlet port 97 regardless of pressure fluctuation therein or in its inlet port 75. It is the pressure compensator mechanism 30 which is responsible for this action and it is the flow control orifice mechanism 31 which predetermines what the volumetric flow through the valve shall be.

In the operation of the pressure compensator mechanism 30, compound piston element or spool 43 is constantly urged toward the closed position shown in FIGURE 1 by the offset spring 50. During normal flow controlling operation of the valve, the biasing action of spring 50 is overridden by onset spring 61, to open the orifice formed by ports 41 and the sharp bottom edge of land 47 of stem 45.

When fluid begins to flow into inlet 75 and the pressure compensator orifice 41, 47 is closed, flow through the compensator is initially blocked, but such flow can enter the chamber 72 below the onset piston 56 through the fixed orifice 85 around the check valves 78, 81. As this flow enters chamber 72, it moves the onset piston 56 upwardly in bore 28 until the piston bottoms against snap ring 52. The piston 56 will remain bottomed in this biasing position, overriding spring 50, so long as the pressure in chamber 69 equals or exceeds the sum of the downward acting fluid pressure forces in chambers 49 and 54 and the pressure of equivalent offset spring 50. Such bottoming brings the force of the onset spring 61 to bear against the compensator spool 43 raising it and opening the compensator orifice 41, 47. The orifice is stabilized when the upward and downwardly acting forces on the compensator spool are equalized. Since the pressures on each side of the flow control orifice are reflected in chambers 49 and 54 on the one hand and in chamber 69 on the other hand, the substantially constant difference between the force of the springs 61 and 50 maintains a constant differential across the flow control orifice, regardless of pressure variations in the inlet or outlet.

By reason of the closed no flow condition of the valve 10, surges are prevented in line 20 when flow through the valve begins. During idle periods the compensator spool 43 is acted upon by offset spring 50 which holds the head 44 against stop 52 thereby closing the compensator orifice. In so doing the offset spring 50 shifts the onset piston 56 toward bore plug 70, to a non-biasing position. As this occurs fluid is displaced from chamber 72 through passages 84 and 83 and check valve 78, 81 into chambers 49, 54, and 69. The check spring 82 acting against the check valve movable member 81 opens to allow this to occur very quickly after flow stops and pressures are otherwise equalized within the valve.

From the foregoing it will be seen that in contrast to the previously referred to Renick valves, the valve of this invention is closed at the onset of operation and opens in a manner preventing surges through it.

While the form of embodiment of the present invention as herein disclosed constitutes a preferred form, it is to be understood that other forms can be adopted within the scope of the claims which follow.

I claim:
1. An adjustable flow control valve comprising,
an inlet,
an outlet,
means forming a selectively adjustable flow control orifice between said inlet and outlet,
pressure compensating means connected in series with said flow control orifice for maintaining a constant pressure drop in fluid flow through said orifice,
said compensating means including a movable spool forming a pressure compensating orifice with a port,
spring means urging said spool toward a closed position with respect to said port,
pressure differential operated means engageable with said spool to override said spring means by applying a resilient force to said spool moving said spool to an open position with respect to said port,
passage means applying pressure fluid from said inlet to said pressure differential operated means for moving the latter to engage said spool and move said spool toward open position, said passage means including a check valve permitting flow from said pres- sure differential operated means toward said inlet but not in the reverse direction,
and a flow restrictor by-passing said check valve.

2. A valve according to claim 1 wherein said pressure differential operated means includes a piston and a spring moved by said piston, opposite surfaces of said piston being connected to said inlet and outlet.

3. A valve according to claim 1 wherein said movable spool has opposite control surfaces connected to the upstream and downstream sides of said flow control orifice.

4. A valve according to claim 3 wherein said pressure differential operated means comprises a piston mounted for sliding movement toward and away from said spool, a contactor for engaging said spool, said contactor being movable over a limited distance with respect to said piston, and a spring urging said contactor toward said spool and away from said piston.

5. A valve according to claim 4 wherein said contactor is mounted for movement in a bore in said piston and wherein movement of said contactor with respect to said piston is limited by a stop in said bore.

6. A valve according to claim 5 wherein orifice closing movement of said spool and wherein movement of said pressure differential operated means toward said spool are both limited by a fixed stop means.

7. An adjustable flow control valve comprising,
an inlet,
an outlet,
means forming a selectively adjustable flow control orifice between said inlet and outlet,
pressure compensating means for maintaining a constant pressure drop across said flow control orifice,
said compensating means including a movable spool forming a pressure compensating orifice with a port,
yieldable means urging said spool toward a position closing said port,
biasing means movable by a piston from non-biasing to biasing engagement with said spool, said biasing means in said biasing engagement with said spool overriding the force of said yieldable means and moving said spool to an open position with respect to said port,
passage means connecting one side of said piston to said inlet for applying pressure to said piston in a direction tending to move said biasing means into biasing engagement with said spool,
and a passageway interconnecting the opposite side of said piston to said outlet.

8. A valve according to claim 7 wherein said biasing means comprises a compression spring bearing at one end on said piston and bearing at the other end on a contactor through which engagement is made with said spool.

9. A valve according to claim 8 wherein said contactor is movably mounted by said piston.

10. A valve according to claim 8 wherein said passage means includes a flow restrictor and further wherein said passage means includes a check valve in parallel with said restrictor, said check valve permitting substantially unimpeded flow from said piston to said inlet.

11. An adjustable flow control valve comprising,
an inlet,
an outlet,
means forming a selectively adjustable flow control orifice between said inlet and outlet,
pressure compensating means for maintaining a constant pressure drop across said flow control orifice,
said compensating means including a spool and means coacting therewith defining a pressure compensating orifice,
yieldable means urging said spool to close said pressure compensating orifice,
pressure operated means movable with respect to said spool to a biasing position in which said pressure operated means applies a substantially constant biasing force to said spool overriding said yieldable means and opening said pressure compensating orifice,
and passage means for applying operating pressure to move said pressure operated means to said biasing position when the pressure at said inlet exceeds the pressure at said outlet by a predetermined amount.

12. An adjustable flow control valve comprising,
an inlet,
an outlet,
means forming a selectively adjustable flow control orifice between said inlet and outlet,
pressure compensating means connected in series with said flow control orifice for maintaining a constant pressure drop in fluid flow through said orifice,
said compensating means including a movable spool forming a pressure compensating orifice with a port,
means constantly urging said spool toward a closed position with respect to said port,
movable spring biasing means shiftable with respect to said spool between spool biasing and non-biasing positions,
said spring biasing means overriding said urging means and moving said spool to open position when said biasing means is in a biasing position,
a piston for moving said spring biasing means from said non-biasing position to a biasing position,
passage means applying pressure from said inlet to one side of said piston in a direction tending to cause the latter to move said spring biasing means to a biasing position,
said passage means including valve means permitting substantially unrestricted flow in the direction therein away from said piston toward said inlet but not in the opposite direction, said passage means also including a flow restrictor by-passing said valve means,
and passage means between the opposite side of said piston and said outlet.

References Cited
UNITED STATES PATENTS

| | | | |
|---|---|---|---|
| 2,476,720 | 7/1949 | Gardiner | 137—501 XR |
| 2,570,351 | 10/1951 | Klessig | 137—501 XR |
| 2,583,296 | 1/1952 | Harrington | 137—501 XR |
| 2,936,152 | 5/1960 | Renick | 251—205 |
| 3,159,178 | 12/1964 | Adams | 137—501 |

M. CARY NELSON, *Primary Examiner.*

R. J. MILLER, *Assistant Examiner.*